United States Patent [19]

Cook et al.

[11] Patent Number: 4,811,185

[45] Date of Patent: Mar. 7, 1989

[54] DC TO DC POWER CONVERTER

[75] Inventors: Alex Cook; Sampat S. Shekhawat, both of Rockford, Ill.

[73] Assignee: Sundstrand Corporation, Rockford, Ill.

[21] Appl. No.: 108,462

[22] Filed: Oct. 15, 1987

[51] Int. Cl.[4] ............................................. H02M 7/537
[52] U.S. Cl. ....................................... 365/17; 363/24; 363/62; 363/98
[58] Field of Search ....................... 363/17, 24, 41, 45, 363/62, 63, 98, 132

[56] References Cited

U.S. PATENT DOCUMENTS 3,775,663 11/1973 Turnbull ................................ 363/41
4,020,361 4/1977 Suelzle et al. .................... 363/132 X

OTHER PUBLICATIONS

IBM Technical Disclosure Bulletin, vol. 28, No. 8, Jan. 1986.
Pp. 9-191 and 9-192 of the "Unitrode Linear IC Data Book 1987-1988" by Unitrodue Corporation, copyright 1987.

Primary Examiner—Patrick R. Salce
Assistant Examiner—Emanuel Todd Voeltz
Attorney, Agent, or Firm—Wood, Dalton, Phillips, Mason & Rowe

[57] ABSTRACT

A DC to DC power converter having first and second input terminals and an output terminal for providing an output voltage at the output terminal which is at a potential halfway between a DC potential applied by a DC power supply across the first and second input terminal is disclosed. The converter comprises first and second switches connected at a switch junction in series across the first and second input terminals, first and second series-coupled diodes coupled at a diode junction across the first and second input terminals in reverse-bias relationship with respect to the DC potential applied across the first and second input terminals, a transformer comprising two windings inductively linked and having first and second ends and a center-tap, the ends coupled between the switch junction and the diode junction and the center-tap coupled to the output terminal and means for alternately switching the first and the second switches at an equal duty factor.

14 Claims, 2 Drawing Sheets

DC TO DC POWER CONVERTER

TECHNICAL FIELD OF THE INVENTION

The present invention relates to a DC to DC power converter an, more particularly, to a converter which provides an output voltage at a level midway between two DC voltages.

BACKGROUND ART OF THE INVENTION

DC to DC power converters are used to convert a DC input voltage provided by a DC power source at a first level to a DC output voltage at a second level.

One example is a neutral forming converter for providing a voltage at a neutral level for an AC load.

Turnbull U.S. Pat. No. 3,775,663 discloses an inverter with an electronically controlled neutral terminal for direct connection to an AC load. Input terminals receive a DC input voltage. A half-bridge inverter is coupled between the input terminals and includes series-connected solid-state switches. A pair of capacitors is coupled between the input terminals and an inductor is coupled between the junction of the solid state switches and the junction of the capacitors. The neutral terminal is coupled to the junction of the inductor with the capacitors. The switches are alternately rendered conductive by closed-loop circuitry to maintain the voltage at the neutral terminal at a neutral voltage.

According to Turnbull, the inductor must be relatively large to minimize ripple current. Due to the large inductor, the switch conduction time must be modified by the closed-loop circuitry to allow the neutral to present a sufficiently low impedance to the load and to load changes.

SUMMARY OF THE INVENTION

In accordance with the present invention, a DC to DC power converter is provided which can be used as a neutral forming converter. The converter requires neither a large filtering inductor nor closed-loop gating circuitry. Thus response time is shortened and complex circuitry is eliminated.

According to a first embodiment, the converter has first and second input terminals and an output terminal and provides an output voltage at the output terminal which is at a potential halfway between first and second DC potentials applied by a DC power source across the first and second input terminals.

The converter comprises first and second switches connected at a switch junction in series between the first and second input terminals, first and second series-connected unidirectional current-conducting devices, e.g. diodes, coupled at a further junction across the first and second input terminals, an energy storage element such as a transformer comprising two windings magnetically linked having first and second terminals or ends and a third terminal or center-tap, the first and second ends being coupled between the switch junction and the further junction and the center-tap being coupled to the output terminal, and means for alternately operating the first and the second switches at substantially equal duty cycles or factors such that a voltage substantially midway between the first and second DC potentials is produced at the output terminal.

The converter further includes a filter network connected to the center-tap of the transducer. The filter network comprises a first capacitor coupled between the first input terminal and the output terminal and a second capacitor coupled between the second input terminal and the output terminal.

According to a second embodiment, the first and second diodes are replaced by third and fourth switches, resulting in a further reduction in ripple current.

BRIEF DESCRIPTION OF THE DRAWINGS

Other features and advantages of the invention will be apparent from the following description taken in connection with the drawings, wherein.

BEST MODE FOR CARRYING OUT THE INVENTION

Figure 1:
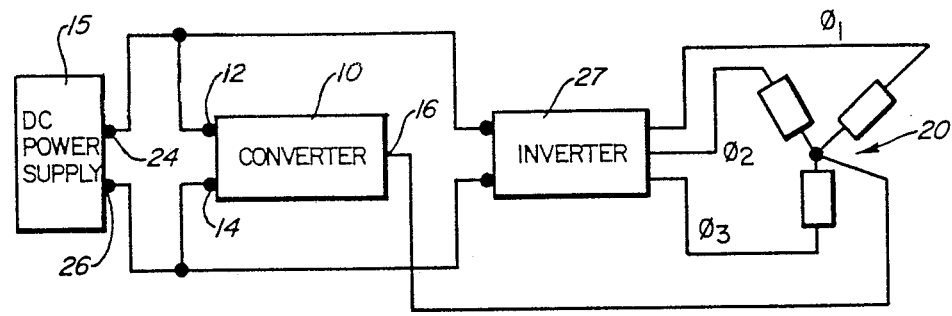
FIG. 1 is a block diagram of a first embodiment of a converter according to the present invention coupled to a DC power supply.

A DC to DC converter 10 having first and second converter input terminals 12, 14 connected to a DC-power supply 15 and a converter output terminal 16 coupled to an AC load 20, is illustrated in FIG. 1. The DC power supply 15 provides DC power comprising a first supply voltage $V_1$ at a first power supply output terminal 24 and a second supply voltage $V_2$ at a second power supply output terminal 26. The DC power supply further provides the DC power to an inverter 27 which converts the DC power to three-phase AC power for use by the AC load 20.

In accordance with the present invention, a converter output voltage $V_0$ is produced by the converter 10 at the converter output terminal 16, wherein the average converter output voltage $V_0$ is halfway between the first and second supply voltages $V_1$ and $V_2$.

In the preferred embodiment, voltages $V_1$ and $V_2$ are of equal magnitude and opposite polarity. Thus, the converter 10 develops an output voltage $V_o$ of zero volts. However, the converter 10 can be used to provide a DC voltage at a level halfway between any other two input voltage levels without departing from the scope of the present invention.

Figure 2:
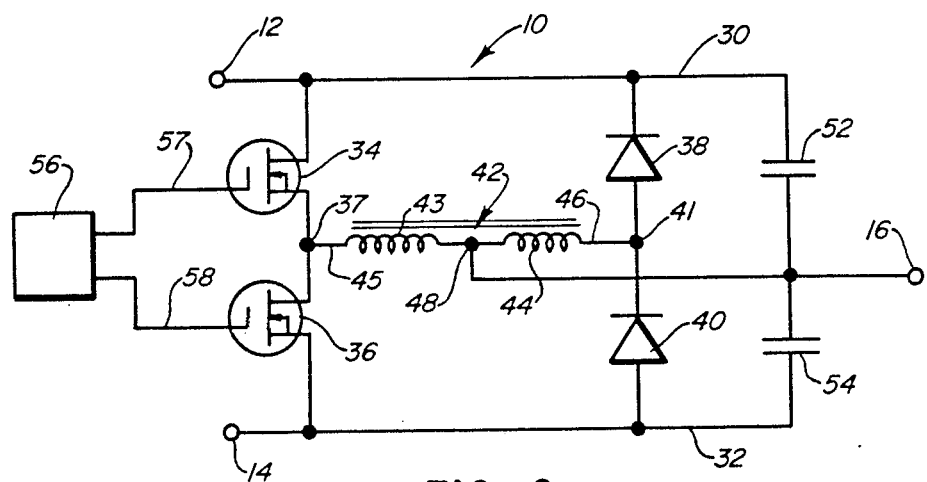
FIG. 2 is a schematic diagram of the converter shown in FIG. 1.

A schematic diagram of the first embodiment of the converter 10 is illustrated in FIG. 2.

The converter 10 includes a first bus 30 coupled to the first converter input terminal 12 and a second bus 32 coupled to the second converter input terminal 14.

First and second switches or transistors 34, 36, preferably MOSFET's, are connected in series at a transistor junction 37 between the first and second busses 30, 32. In the event bipolar transistors are used for the first and second switches, an antiparallel diode is coupled across each of the bipolar transistors to prevent damage due to reverse current.

First and second unidirectional current-conducting devices, such as diodes 38, 40 are also connected in series at a further or diode junction 41 across the first and second busses 30, 32 and are poled such that they are in reverse-bias relationship relative to the DC power provided by the DC power supply 15.

An energy storage element in the form of a transformer 42 comprises first and second magnetically-linked windings 43, 44 and has first and second terminals or ends 45, 46 and a third terminal or center-tap 48. The transformer 42 has a 1:1 turns ratio and can be, for example, an auto-transformer. The first and second terminals 45, 46 are coupled between the transistor junction 37 and the diode junction 41. The third terminal or center-tap 48 is coupled to the converter output terminal 16. A first capacitor 52 is connected between the third output terminal 20 and the first bus 30, and a second capacitor 54 is connected between the third output terminal 20 and the second bus 32. The first and second capacitors 52, 54 operate as an output filter to reduce output ripple.

Transistor gating circuitry 56 operates the first and second switches 34, 36.

Figure 3:
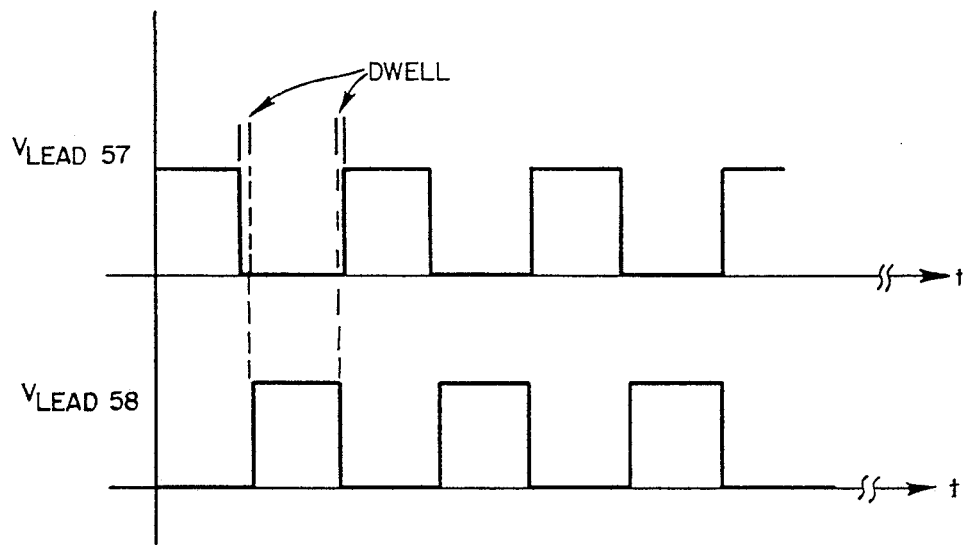
FIG. 3 is a waveform diagram illustrating illustration of the switches in the converter of FIG. 2.

A waveform diagram illustrating the output of the transistor gating circuitry 56 is illustrated in FIG. 3. During operation, the transistor gating circuitry 56 alternately turns on the first and second switches 34, 36, via transistor control leads 57, 58, respectively, for equal time intervals. It is preferred that each of the switches 34, 36 operate at just less than 50% duty factor, such that a short dwell interval is interposed between turn off of one of the switches and turn on of the other. The dwell interval is of a duration sufficient to prevent shoot-through.

Referring again to FIG. 2, during operation, when the first switch 34 is on and the second switch 36 is off, the first voltage $V_1$ appears at the transistor junction 37, neglecting the voltage drop across the switch 34. Owing to the 1:1 turns ratio of the windings 43, 44, the voltage drops across the windings 43, 44 are equal. Hence, the voltage $V_d$ at the diode 41 is equal to $V_1 - 2(V_1 - V_c)$, where $V_c$ is the voltage at the center-tap 48, provided that the voltage $V_d$ is greater than one diode drop below $V_2$. Alternatively, when the first switch 34 is off and the second switch 36 is on, the second voltage $V_2$ transistor junction 37, neglecting the drop across the second switch 36. The voltage $V_d$ at the diode junction 41, in this case, is equal to $V_2 + 2(V_c - V_2)$, provided that the voltage $V_d$ is less than one diode drop above $V_1$. The voltage $V_d$ cannot be less than one diode drop below the voltage $V_2$ nor can it exceed one diode drop above $V_1$ due to the presence of the diodes 38, 40.

By alternately switching the first and second switches 34, 36 rapidly, the center-tap voltage $V_c$ will settle at an average level halfway between the first and second supply voltages $V_1$, $V_2$, thus providing at the converter output terminal 16 a filtered output voltage $V_o$ midway between the first and second supply voltages $V_1$, $V_2$.

For high power applications, the first and second switches 34, 36 are switched at a frequency on the order of 5-10 kHz. For lower power applications, the switching frequency is higher.

The converter 10 will passively maintain the output voltage halfway between the first and second supply voltages $V_1$, $V_2$, even when the AC load 20 is unbalanced because any DC potential across the transformer resulting from the imbalance of the AC load 20 will cause a current to flow out through one of the diodes 38, 40, thus discharging the DC potential. This occurs every time the appropriate switch is on, and hence the filter capacitors will charge and discharge once every cycle. The peak-to-peak ripple voltage is given by $$V = \frac{IT}{C1 + C2}$$

I is the neutral current;
T is the off-time of either switch; and
C1 and C2 are the capacitances of the output capacitors 52, 54.

Figure 4:
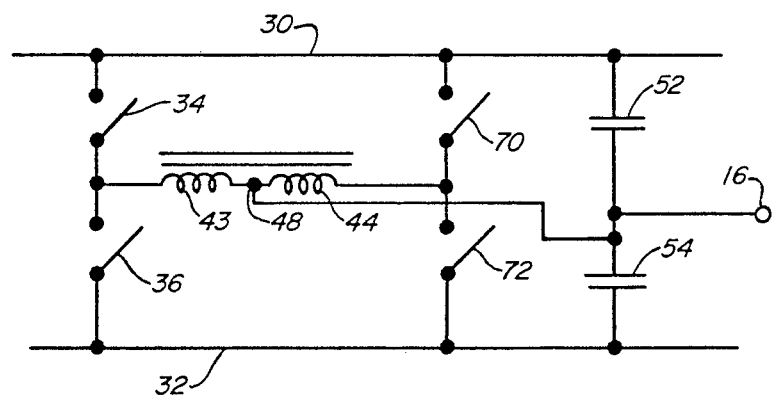
FIG. 4 is a schematic diagram of a converter according to a second embodiment of the present invention.

The ripple can be almost entirely eliminated by using an embodiment comprising a full bridge circuit, as illustrated in FIG. 4. According to this embodiment, the diodes 38 and 40 are replaced by third and fourth switches or transistors 70, 72.

The third and fourth switches 70, 72 are preferably MOSFET's. In the event bipolar transistors are used for the third and fourth switches, an antiparallel diodes is coupled across each of the bipolar transistors to prevent damage due to reverse current. The switch 70 is operated with the switch 36 while the switch 72 is operated with the switch 34. Ripple is reduced in this embodiment, since the only capacitor charge time is now the off-period during which neither pair of the switches is on. A further benefit of this embodiment is that the switches share the neutral current and each switch only conducts approximately half of the neutral current.

We claim:

1. A DC to DC power converter having first and second input terminals and an output terminal, the converter providing an output voltage at the output terminal which is at a potential substantially midway between a DC potential applied by a DC power supply across the first and second input terminals, comprising:
   first and second switches connected together at a switch junction to form a switch series combination which is coupled between the first and second input terminals;
   first and second series-coupled diodes connected together at a diode junction to form a diode series combination which is coupled across the first and second input terminals in reverse-bias relationship with respect to the DC potential applied across the first and second input terminals;
   a transformer comprising two windings inductively linked together and having first and second ends and a center-tap, the ends being coupled to the switch junction and to the diode junction, respectively, and the center-tap being coupled to the output terminal; and
   means for alternately switching the first and the second switches at equal duty factors.

2. The converter of claim 1, wherein the first and second switches comprise transistors.

3. The converter of claim 2, wherein the transistors comprise MOSFET transistors.

4. The converter of claim 1, including a filter network coupled to the output terminal.

5. The converter of claim 4, wherein the filter network comprises a first capacitor coupled between the first input terminal and the output terminal and a second capacitor coupled between the second input terminal and the output terminal.

6. A neutral forming converter for developing a neutral potential from positive and negative DC voltages of substantially equal magnitude provided by a DC power supply comprising:
   positive and negative input terminals coupled to the DC power supply and receiving the positive and negative DC voltages, respectively;
   an output terminal;
   first and second switches connected together at a switch junction to form a switch series combination which is coupled across the positive and negative input terminals;

first and second diodes connected together at a diode junction to form a diode series combination which is coupled across the positive and negative input terminals, the first and second diodes being poled in reverse bias with respect to the DC voltage applied by the DC power supply;

a transformer having first and second ends and a center-tap, the first and second ends being coupled to the switch junction and to the diode junction, respectively, and the center-tap being coupled to the neutral output terminal; and means for alternately switching the first and the second switches at equal duty factors such that the potential of the neutral output terminal is substantially at zero.

7. The converter of claim 6 wherein the first and second switches comprise transistors.

8. The converter of claim 7 wherein the transistors comprise MOSFET transistors.

9. The converter of claim 6 including a filter network coupled to the neutral output terminal.

10. The converter of claim 9 wherein the filter network comprises a first capacitor coupled between the positive power rail and the neutral output terminal and a second capacitor coupled between the negative power rail and the neutral output terminal.

11. A power converter for developing an output voltage from first and second voltages provided at input terminals, comprising:

first and second switches coupled together at a switch junction to form a first series combination, the first series combination being coupled across the input terminals;

an energy storage element having a first terminal coupled to the switch junction, a second terminal and a third terminal wherein the third terminal comprises an output of the power converter;

third and fourth switches coupled together at a further junction to form a second series combination, the second series combination being coupled across the input terminals, the second terminal of the energy storage element being connected to the further junction; and means for operating the first and third switches alternately with the second and fourth switches at substantially equal duty cycles such that a voltage substantially midway between the first and second voltages is produced at the output terminal.

12. The power converter of claim 11, wherein each of the switches comprises a transistor.

13. The power converter of claim 11, wherein each of the switches comprises a MOSFET transistor.

14. The power converter of claim 11, wherein the energy storage element comprises a transformer having inductively linked, series-connected first and second windings wherein the first terminal is coupled to a first end of the first winding, the second terminal is coupled to a second end of the second winding and the third terminal is coupled to a junction connecting a second end of the first winding and a first end of the second winding.

* * * * *